United States Patent [19]
Ortiz et al.

[11] Patent Number: 4,963,289
[45] Date of Patent: Oct. 16, 1990

[54] METHOD FOR PRODUCING MONODISPERSE AEROSOLS

[75] Inventors: Lawrence W. Ortiz, Los Alamos, N. Mex.; Sidney C. Soderholm, Pittsford, N.Y.

[73] Assignee: The United States of America as represented by the United States Department of Energy, Washington, D.C.

[21] Appl. No.: 331,985

[22] Filed: Jun. 8, 1989

Related U.S. Application Data

[62] Division of Ser. No. 246,062, Sep. 19, 1988, Pat. No. 4,917,830.

[51] Int. Cl.[5] .......... C09K 3/30
[52] U.S. Cl. .......... 252/305; 252/321; 73/59; 239/338; 239/8
[58] Field of Search .......... 252/305, 321; 239/338, 239/8

[56] References Cited

U.S. PATENT DOCUMENTS

| | | | |
|---|---|---|---|
| 4,129,252 | 12/1978 | Pouring | 239/2 |
| 4,213,768 | 7/1980 | Bowman et al. | 55/97 |
| 4,327,594 | 5/1982 | Nelson | 73/863.22 |
| 4,515,134 | 5/1985 | Warren, II | 123/557 |
| 4,548,262 | 10/1985 | Hull | 165/111 |
| 4,583,365 | 4/1986 | John | 60/531 |
| 4,584,259 | 4/1986 | Mayer et al. | 430/273 |
| 4,592,939 | 6/1986 | Temple et al. | 428/64 |
| 4,670,137 | 6/1987 | Koseki et al. | 210/96.1 |
| 4,687,929 | 8/1987 | Browner et al. | 250/282 |
| 4,710,887 | 12/1987 | Ho | 364/555 |
| 4,917,830 | 4/1990 | Ortiz et al. | 261/18.1 |

OTHER PUBLICATIONS

Sutigin, A. G. et al., "Formation of Condensation Aerosols at High Vapor Saturation," *J. Colloid Inter. Sci.* vol. 27, (1968), p. 216.
Fuchs, N. A. et al., *Highly Dispersed Aerosols,* Trans. by Israel Program for Sci. Trans., Ann Arbor Sci. Publishers (1970), pp. 27–30.
Huang. C. M. et al., "Aerosol Studies by Light Scattering," *J. Col. and Interf. Sci.,* vol. 33, No. 2 (Jun. 1970), p. 244.
Porstendörfer et al., "Heterogeneous Nucleation. . . ", *Aerosol Sci and Tech.,* vol. 4, pp. 65–79, (1985).
Tuohig, W. D., "Generation and Characterization of Laboratory Aerosols", *Proc. Tech Program, Int. Powder Bulk Solids Handl. Proc.* (1983), pp. 391–407.

*Primary Examiner*—Richard D. Lovering
*Assistant Examiner*—John M. Covert
*Attorney, Agent, or Firm*—Milton D. Wyrick; Paul D. Gaetjens; William R. Moser

[57] ABSTRACT

An aerosol generator is described which is capable of producing a monodisperse aerosol within narrow limits utilizing an aqueous solution capable of providing a high population of seed nuclei and an organic solution having a low vapor pressure. The two solutions are cold nebulized, mixed, vaporized, and cooled. During cooling, particles of the organic vapor condense onto the excess seed nuclei, and grow to a uniform particle size.

9 Claims, 1 Drawing Sheet

METHOD FOR PRODUCING MONODISPERSE AEROSOLS

This invention is a result of a contract with the Department of Energy (Contract No. W-7405-ENG-36).

This is a division of application Ser. No. 07/246,062 filed 09/19/88, now U.S. Pat. No. 4,917,830.

BACKGROUND OF THE INVENTION

The present invention relates to the field of aerosol generation, and, more specifically, to the generation of monodisperse aerosols, that is, aerosols containing particles whose geometric mean diameters are essentially equal.

High efficiency particulate air filters are widely used for cleaning airstreams of particulate contaminants for the protection of people, equipment and the environment. Before being placed into service, it is vital to test these filter materials for their ability to trap particles of known sizes. Such testing is done with devices known as penetrometers, which use an aerosol to challenge the filter material. Particle penetration through the material is generally measured by particle sensing instruments, such as a forward light-scattering photometer, located downstream from the material. In such testing, it is important that the penetrometer produce a well characterized aerosol, and it is preferable that the particles of the aerosol be equal, or substantially equal, in size.

Such aerosols are also important in the testing and calibration of air supply and sampling equipment. For example, both electronic and optical instruments are widely used to measure air pollution and emissions from industrial plants. It is imperative that these instruments be accurate throughout their useful lives.

To accurately calibrate these instruments, aerosols containing particles of known size distributions, or preferably, of substantially equal size, are required. Aerosols of this type, having particles of substantially the same size, are referred to herein as monodisperse aerosols.

Monodisperse aerosol generators also are used as a source for injection of uniform particles into internal combustion engines, and as a source of sample solutions into flame and plasma atomic spectrometers. They are also widely applied with mass spectrometers as a means of introducing a solution.

Numerous attempts have been made in the past to create high airborne concentrations of monodisperse aerosols. None has been particularly successful. A recent attempt by the A. D. Little Company used flash vaporization of a liquid followed by ambient cooling to induce self condensation in an attempt to produce equally sized particles. However, testing revealed that this generator was not capable of producing a monodisperse aerosol.

Another method of producing a monodisperse aerosol is disclosed in Browner, et al U.S. Pat. No. 4,687,929. Here, a solvent is entrained in a preferably inert sheath gas, such as argon or helium. The entrained solvent passes into a confined space where desolvation occurs. The diameter of the aerosol particles is controlled by the diameter of the orifice through which the solvent flows. This system is primarily intended to supply small quantities of aerosols to a mass spectrometer or liquid chromatograph.

It is an object of the present invention to provide apparatus capable of generating high concentrations of a monodisperse aerosol at high flow rates.

It is a further object of the present invention to provide a monodisperse aerosol in which the geometric mean diameter (GMD) of the particles in the aerosol can be easily varied at least within the range of 0.2–0.5 $\mu$m, and a GMD of less than 1.3 can be maintained.

It is a still further object of the invention to provide a monodisperse aerosol using various organic liquids having low vapor pressures.

It is a still further object of the invention to provide an aerosol in which the particles have a geometric standard deviation (GSD) of about 1.3 or less.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, apparatus for generating monodisperse aerosols may comprise a monodisperse aerosol generator having means for delivering a first solution and a second solution, the first and second solutions having boiling points, and vaporization means receiving said first and second solutions for vaporizing the first and second solutions. Condensation means receive the vaporizing first and second solutions for condensing vapors of the vaporized first solution onto particles of the vaporized second solution in an atmosphere conductive to uniform growth of the condensed vapors on the particles. The resulting monodisperse aerosol, comprising the condensed vapors first and second on the particles is outputted to test HEPA filters, to provide an input to a spectrometer, or to any other equipment in need of an aerosol of particles of substantially equal size.

In a further aspect of the present invention, and in a method for producing a monodisperse aerosol may comprise the steps of mixing a first and second solution, the first and second solutions having boiling points; vaporizing the mixed first and second solutions to produce vapors of the first solution and particles of the second solution; cooling the vapors and the particles with a surrounding flow of cool air to condense the vapors onto the particles, and to promote uniform growth of the condensed vapors on the particles; and outputting a monodisperse aerosol comprising the condensed vapors on the particles.

BRIEF DESCRIPTION OF THE DRAWINGS

The accompanying drawing, which is incorporated in and forms a part of the specification, illustrates an embodiment of the present invention and, together with the description, serves to explain the principles of the invention. In the drawing.

DETAILED DESCRIPTION

Figure 1:
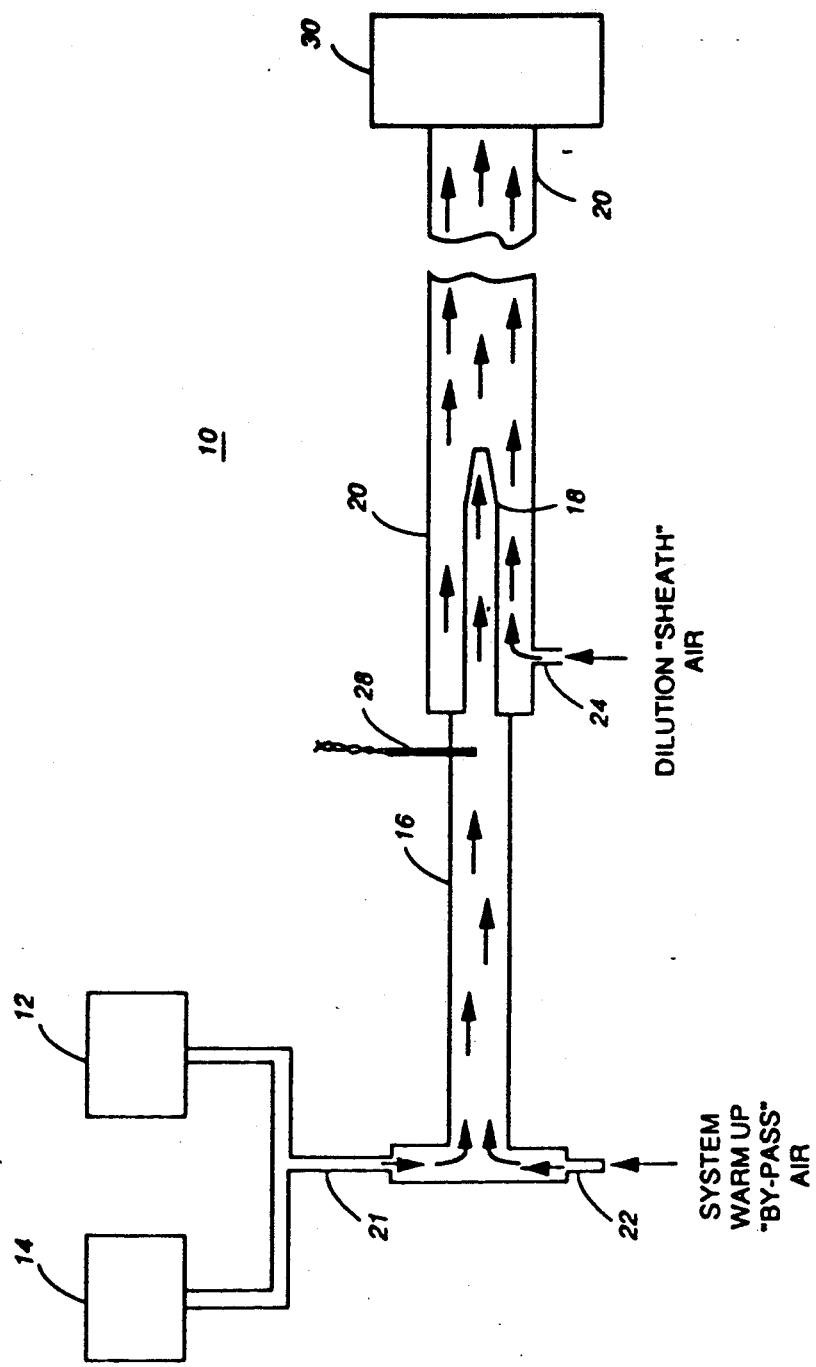
FIG. 1 is a schematic flow diagram of a monodisperse aerosol generator according to the present invention.

Reference is now made to FIG. 1, wherein there is shown a schematic flow diagram of one embodiment of a monodisperse aerosol generator according to the present invention generally denoted 10, comprising cold nebulizers 12, 14, vaporization tube 16, and condensation tube 20. Cold nebulizers 12, 14 are air operated single jet Laskin Nozzle Nebulizers. Vaporization tube 16 is a stainless steel tube having aerosol inlet 21 and warm up air inlet 22, and terminating in nozzle 18 inside condensation tube 20. Vaporization tube 16 is wrapped with conventional high wattage heat tape (not shown), although other heating means could be employed which are capable of achieving temperatures in the range of 100°-200° C. in vaporization tube 16. Thermocouple 28 provides a means of monitoring the temperature inside vaporization tube 16 near nozzle 18. Condensation tube 20 is simply a tube constructed of TEFLON ® having dilution air inlet 24.

The aerosol outputs of cold nebulizers 12, 14 are combined prior to being injected into vaporization tube 16. System warm up air is also introduced into vaporization tube 16 prior to operation to warm vaporization tube 16 so that residue deposits do not form, but is normally shut off prior to introduction of the aerosols. However, in some cases, warm up air flow is continued for the purposes of diluting highly concentrated aerosols and increasing the flow rate of the aerosols through vaporization tube 16.

Cold nebulizer 12 nebulizes an organic solution of interest. The organic solution should have a low vapor pressure, so that it's particles will not evaporate after condensation in condensation tube 20. Cold nebulizer 14 nebulizes a dilute aqueous solution which is capable of providing a high population of seed nuclei and having a relatively high vaporization temperature. Examples of satisfactory aqueous solutions are sodium chloride and any of the silver halides.

Vaporization tube 16 terminates in nozzle 18, which preferably comprises TEFLON ®, inside condensation tube 20. Cool dilution air is also introduced into condensation tube 20 through dilution air inlet 24 and acts as a flowing sheath and cooling gas for the now vaporized aerosols. The aerosols condense keeping the aerosols away from the walls of condensation tube 20 onto the seed nuclei in condensation tube 20, forming stable monodisperse particles which can then be introduced into apparatus 30, which may be a penetrometer for testing HEPA filters, a spectrometer, or equipment for the calibration or testing of air quality monitoring devices.

In operation, cold nebulizer 12 produces a fine polydisperse aerosol of an organic solution of interest which has a low vapor pressure. This fine polydisperse aerosol is mixed with a fine aqueous solution aerosol produced by cold nebulizer 14, prior to being injected into vaporization tube 16, where both aerosols are flash vaporized. These fine aerosols allow rapid vaporization of the solutions at temperatures near their primary liquid boiling points, thus substantially lessening the possibility of thermal decomposition of the particles. Particular vaporization temperatures, while near liquid boiling points, must be experimentally determined. The aerosol droplets of aqueous solution dry to very small seed nuclei particles that do not evaporate because of the high vaporization temperature of the seed nuclei. Cold nebulizers 12, 14 are single jet Laskin nebulizers comprised of TEFLON ®.

After exiting vaporization tube 16 through nozzle 18, the organic vapors are condensed in condensation tube 20. In this embodiment, the organic vapor and the seed nuclei are flowing through nozzle 18 at relatively high velocities (approximately 30 m/sec) when they axially enter condensation tube 20, and mix with the cool, slower moving (approximately 5 m/sec) dilution air. This turbulent mixing in the chemically inert environment of condensation tube 20 promotes condensation of the organic vapor in the presence of an excess of seed nuclei, resulting in controlled, uniform organic growth on the seed nuclei. Total air flow rates of the generator's output are typically 85 L/min or greater, depending on the air pressures to cold nebulizers 12, 14, and the quantity of dilution air added through dilution air inlet 24.

The aerosol produced within condensation tube 20 from the growth of organic vapor on the seed nuclei comprises particles whose diameters can be easily controlled within a narrow range, particle size being determined by the ratio of organic material to seed nuclei concentration. This ratio is controlled by regulating the relative air pressures to each cold nebulizer 12, 14.

The monodisperse aerosol produced in this manner is very stable, and can be monitored with a LAS-X Laser Aerosol Spectrometer made by Particle Measuring Systems of Boulder, Colorado. The output of the LAS-X can be connected to a microcomputer, such as a Hewlett-Packard HP-85. Samples of the monodisperse aerosol for the LAS-X spectrometer could be obtained from a port in condensation tube 20 (not shown).

Other embodiments of the invention may not utilize cold nebulizers 12, 14 to introduce the solutions into vaporization tube 16. There are numerous other ways of accomplishing this, such as by metering, by wiping thin films onto the hot walls of vaporization tube 16, or by any other aerosolization technique. The only requirement is that the solutions be introduced into vaporization tube 16 in a form which will maximize surface area and facilitate rapid vaporization.

EXAMPLE 1

Tetraethylene glycol (TEG), an organic solution of interest, was nebulized by a Laskin Nozzle Nebulizer at 10 psig, producing a flow of 7.5 L/min. An aqueous NaCl solution of 0.3% w/volume was nebulized by a second Laskin Nozzle Nebulizer at 5.5 psig, producing a flow of 8.0 L/min. The two aerosols were mixed together and introduced into a vaporization tube, which had a temperature of 165°±5° C. The temperature in the vaporization tube was achieved through use of high wattage heat tape wrapped around the tube, and the temporary usage of warm by-pass air introduced into the tube prior to injection of the mixed aerosols. After flowing through the vaporization tube, the mixture was injected through a nozzle into a condensation chamber along with a flow of dilution air at 145 L/min., creating a total flow rate of 160 L/min. Over a six hour period of operation, 29 measurements were taken with the LAS-X. These measurements indicated that the aerosol particles had a GMD of 0.33±0.005 μm, and a GSD of 1.16±0.007.

EXAMPLE 2

Oleic acid, another solution of interest, was nebulized at 4.0 psig and a flow rate of 4.5 L/min. The same solution of NaCl as was used in Example 1 was nebulized at 6.0 psig and a flow rate of 8.5 L/min., mixed with the oleic acid aerosol and injected into the vaporization tube which was at a temperature of 160°±5° C. In this case, due to the high mass concentration of the oleic acid aerosol, it was necessary to continue use of the by-pass air at a rate of 18 L/min. in order to dilute the aerosol and to decrease the residence time of the aerosol in the vaporization tube. In the condensation tube, the dilution air flow rate was 144 L/min., and the total air flow rate was 175 L/min. Over a six hour period, 26 measurements were taken. The GMD of the particles was found to be 0.31±0.002 μm, and the GSD was 1.20±0.009.

EXAMPLE 3

In this test, di-(2-ethylhexyl)-phthalate (DEHP) was nebulized at 7.0 psig and a flow rate of 6.0 L/min. The same solution of NaCl as was used in the previous examples was nebulized at 4.0 psig and a flow rate of 6.5 L/min., mixed with the DEHP aerosol, and injected into the vaporization tube which was at a temperature of 164°±2° C. In the condensation tube, the dilution air flow was 75 L/min., and the total air flow rate was 88 L/min. Over a six hour period, 29 measurements were made with the LAS-X. The GMD was found to be 0.30±0.007 μm, and the GSD to be 1.14±0.003.

The foregoing description of the present invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of producing a monodisperse aerosol comprising the steps of:
    mixing an organic liquid having a low vapor pressure with an aqueous solution having a high population of seed nuclei;
    nebulizing said mixed organic liquid and said aqueous solution;
    heating to flash vaporize nebulized organic liquid and said aqueous solution to produce vapors of said organic liquid and particles of said aqueous solution;
    cooling said vapors and said particles with a surrounding flow of cool air to condense said vapors onto said particles, and to promote uniform growth of said condensed vapors on said particles; and
    outputting a monodisperse aerosol comprising said condensed vapors on said particles.

2. The method as described in claim 1, wherein said nebulized organic liquid and said aqueous solution are flash vaporized at a temperature near the boiling points of said nebulized organic liquid and said aqueous solution.

3. The method as described in claim 1, wherein said organic liquid comprises oleic acid.

4. The method as described in claim 1, wherein said organic liquid comprises tetraethylene glycol.

5. The method as described in claim 1, wherein said organic liquid comprises di-(2-ethylhexyl)-phthalate.

6. The method as described in claim 1, wherein said aqueous solution comprises a sodium chloride solution.

7. The method as described in claim 1, wherein said aqueous solution comprises a silver halide solution.

8. The method as described in claim 1, wherein said step of outputting a monodisperse aerosol includes outputting said monodisperse aerosol to a penetrometer for testing HEPA filters.

9. The method as described in claim 1, wherein said step of outputting a monodisperse aerosol includes outputting said monodisperse aerosol to a spectrometer.

* * * * *